(12) United States Patent
Rhee et al.

(10) Patent No.: US 7,550,086 B2
(45) Date of Patent: Jun. 23, 2009

(54) ADVANCED TREATMENT METHOD OF ETHANOLAMINE-WASTEWATER BASED ON PHYSICO-CHEMICAL AND BIOLOGICAL COUPLING PROCESS

(76) Inventors: In hyoung Rhee, 202-1404 Daelim Handle Apt. 545, Sinbu-dong, Cheonan-si, Chungcheongnam-do (KR); Dae chul Cho, 111-201- Daedong Apt., Buldang-dong, Cheonan-si, Chungcheongnam-do (KR); Byung gi Park, 404 Jangwon villa, 386 Yangjae-dong, Seocho-gu, Seoul (KR); Hyun kyoung Ahn, 528-8 Deungchon 2-dong, Gangseo-gu, Seoul (KR); Hyun jun Jung, 750-17 Jowon-dong, Jangan-gu, Suwon-si, Gyeonggi-do (KR); Jun taek Hyun, 306-807 Woosung Mokryeon Apt., Beomgye-dong, Dongan-gu, Anyang-si, Gyeonggi-do (KR); Nam Soo Huh, 1197 Palborg-ri, Seo-myeon, Hongcheon-gun, Gangwon-do (KR); Mi hae Yoon, 291-24, Wongjong 1-dong, Ojeong-gu, Bucheon-si, Gyeonggi-do (KR); Hyun kak Han, 530-1201 Walibong Hyundae Apt., Ssangyoung-dong, Cheonan-si, Chungcheongnam-do (KR)

( * ) Notice: Subject to any disclaimer, the term of this patent is extended or adjusted under 35 U.S.C. 154(b) by 55 days.

(21) Appl. No.: 11/829,607

(22) Filed: Jul. 27, 2007

(65) Prior Publication Data
US 2008/0179241 A1 Jul. 31, 2008

(51) Int. Cl.
*C02F 3/30* (2006.01)
(52) U.S. Cl. .................. 210/605; 210/615; 210/623; 210/631; 210/903

(58) Field of Classification Search .............. 210/605, 210/615, 616, 620, 621, 623, 631, 903; 435/262, 435/262.5
See application file for complete search history.

(56) References Cited

U.S. PATENT DOCUMENTS
2007/0138091 A1* 6/2007 Yamasaki et al. .......... 210/620

FOREIGN PATENT DOCUMENTS
JP 1999033586 7/1997

(Continued)

Primary Examiner—Fred Prince
(74) Attorney, Agent, or Firm—Michael F. Hughes; Hughes Law Firm, PLLC

(57) ABSTRACT

Advanced treatment method and system of ethanolamine-containing wastewater are disclosed, which perform physicochemical and biological treatment processes. The method regenerates cation exchange resin that captures ethanolamine discharged from a nuclear power plant or a thermal power station, concentrates the ethanolamine-containing wastewater to reduce the volume of the wastewater, and then treats the highly concentrated ethanolamine-containing wastewater through biological decomposition and denitrification processes. The system for treating ethanolamine-containing wastewater performs the physicochemical process (ion-exchange and resin regenerations) where the waster is concentrated, and then applies the biological process to the small amount of wastewater highly concentrated. The physicochemical process is composed of exchanging ions and eluting/concentrating ethanolamine using sodium hydroxide. The wastewater of a few to tens of thousands ppm is transferred and undergoes a biological process where the ethanolamine is decomposed, converted into $CO_2$ and $N_2$ through the anoxic tank and two aerobic tanks, and then discharged in gas. Therefore, the wastewater is discharged, satisfying the biochemical oxygen demand value and the nitrogen content required by the environmental discharge standard.

13 Claims, 2 Drawing Sheets

FOREIGN PATENT DOCUMENTS

| | | | |
|---|---|---|---|
| JP | 10-62597 | * | 3/1998 |
| JP | 1999000693 | | 1/1999 |
| JP | 11-156392 | * | 6/1999 |
| JP | 2005066544 | | 8/2003 |
| JP | 2006142192 | | 11/2004 |
| JP | 2004-351419 | * | 12/2004 |

* cited by examiner

ADVANCED TREATMENT METHOD OF ETHANOLAMINE-WASTEWATER BASED ON PHYSICO-CHEMICAL AND BIOLOGICAL COUPLING PROCESS

RELATED APPLICATIONS

This application claims priority benefit of Korean Serial Number 10-2006-0071410, filed Jul. 28, 2006.

BACKGROUND OF THE DISCLOSURE a) Field of the Disclosure

The present invention relates to a method for processing ethanolamine-containing wastewater generated in a nuclear power plant or thermal power station. More particularly, this invention relates to an advanced treatment method of ethanolamine-containing wastewater, based on a combination of physicochemical and biological treatment processes, which is comprised of the regeneration of cation exchange resin capturing ethanolamine discharged from a nuclear power plant or a thermal power station with sodium hydroxide, the concentration of the regeneration wastewater by evaporation and condensation, and then the treatment of the highly concentrated ethanolamine-containing wastewater through biological decomposition and denitrification processes.

b) Background Art

Nuclear power plants and thermal power stations use water as energy transfer medium to obtain electric energy from nuclear or fossil fuels. Generally, water/steam circulation systems in the plants vaporize water to rotate a turbine that produces electricity, and then condense the vapor to water, continually repeating this circulation.

The circulated and condensed water may corrode parts included in the system. To prevent corrosion, chemicals, such as a pH control agent and a chemical-potential control agent, are injected into the circulating water, thereby controlling electrochemical corrosion of the metal parts of the system.

The water/steam circulation system of the nuclear power plant and thermal power station is installed with an ion-exchange resin tower. Chemicals that are injected into the system to control corrosion are removed, along with some impurities as well, while water remains in the water/steam circulation system. After this step, the chemicals must be injected into the system again. That is, at each water/steam circulation cycle, the chemicals are removed by an ion exchange resin, and then chemicals are newly injected into the system. Such a process is repeated. All chemical species captured by the ion exchange resin are released into the wastewater through a resin regeneration process. This wastewater must meet the environmental discharge standard.

The environmental discharge standard for the wastewater was strict. Since chemicals injected into the system are volatile, they were discharged into the air while the wastewater was treated. For example, heavy metals, etc., discharged from the nuclear plants were treated through a simple physico-chemical process.

However, it is difficult to meet a wastewater discharge standard for ethanolamine newly adopted as a pH control agent, of whose corrosion inhibition effect was proven. The ethanolamine used as a pH control agent has a chemical formula $NH_2CH_2CH_2OH$, consisting of carbon, hydrogen, oxygen and nitrogen. If the ethanolamine exists in wastewater, it causes an increase in biological oxygen demand (BOD), biochemical oxygen demand (COD), and nitrogen concentration whose values are defined in the environmental discharge standard. Therefore, the ethanolamine-containing wastewater must be treated to meet the environmental discharge standard before being discharged.

Therefore, the ethanolamine-containing wastewater discharged from a nuclear power plant or thermal power station needs to be treated in compliance with the environmental discharge standard.

SUMMARY OF THE DISCLOSURE

Therefore, the present invention has been made in view of the above problems, and it is an object of the present invention to provide an advanced treatment method of ethanolamine-containing wastewater that can reduce the volume of ethanolamine-containing wastewater discharged from the nuclear power plant and thermal power station, and treat the highly concentrated wastewater biologically, biochemically, and cost-effectively to meet an environmental discharge standard, thereby enhancing its industrial usefulness.

In accordance with the present invention, the above and other objects can be accomplished by the provision of an advanced treatment method of ethanolamine-containing wastewater including a physicochemical process and a biological process.

The physicochemical process includes: (1) an ion-exchanging step where ethanolamine in wastewater is captured by means of cation exchange resin (2) filled within an ion exchange resin tower (1); and (2) a concentrating step where sodium hydroxide solution (4) flown from a sodium hydroxide tank (3) and air (5) are passed through the cation exchange resin (2) to reduce the volume of the ethanolamine-containing wastewater.

The biological process is a process where the ethanolamine-containing wastewater highly concentrated through the physicochemical process is passed through and treated by an anoxic tank, a first aerobic tank, and a second aerobic tank.

Preferably, the physicochemical process further includes the adsorption of gaseous ethanolamine discharged from the ion exchange resin tower using an absorbent agent filled in an adsorption tower installed in one side of the ion exchange resin tower to prevent the gaseous ethanolamine from being discharged into the air; and digesting the absorbent agent, which adsorbed the ethanolamine in pure water, to regenerate the adsorbent agent.

Preferably, the pure water refers to water where there are no other components present, and is referred to as distilled water or deionized water (or first or second deionized water).

BRIEF DESCRIPTION OF THE DRAWINGS

The above and other objects, features, and other advantages of the present invention will be more clearly understood from the following detailed description taken in conjunction with the accompanying drawings, in which.

DESCRIPTION OF THE PREFERRED EMBODIMENTS

Preferred embodiments according to an advanced treatment method of ethanolamine-containing wastewater of the present invention will be described in detail with reference to the accompanying drawings.

Figure 1:
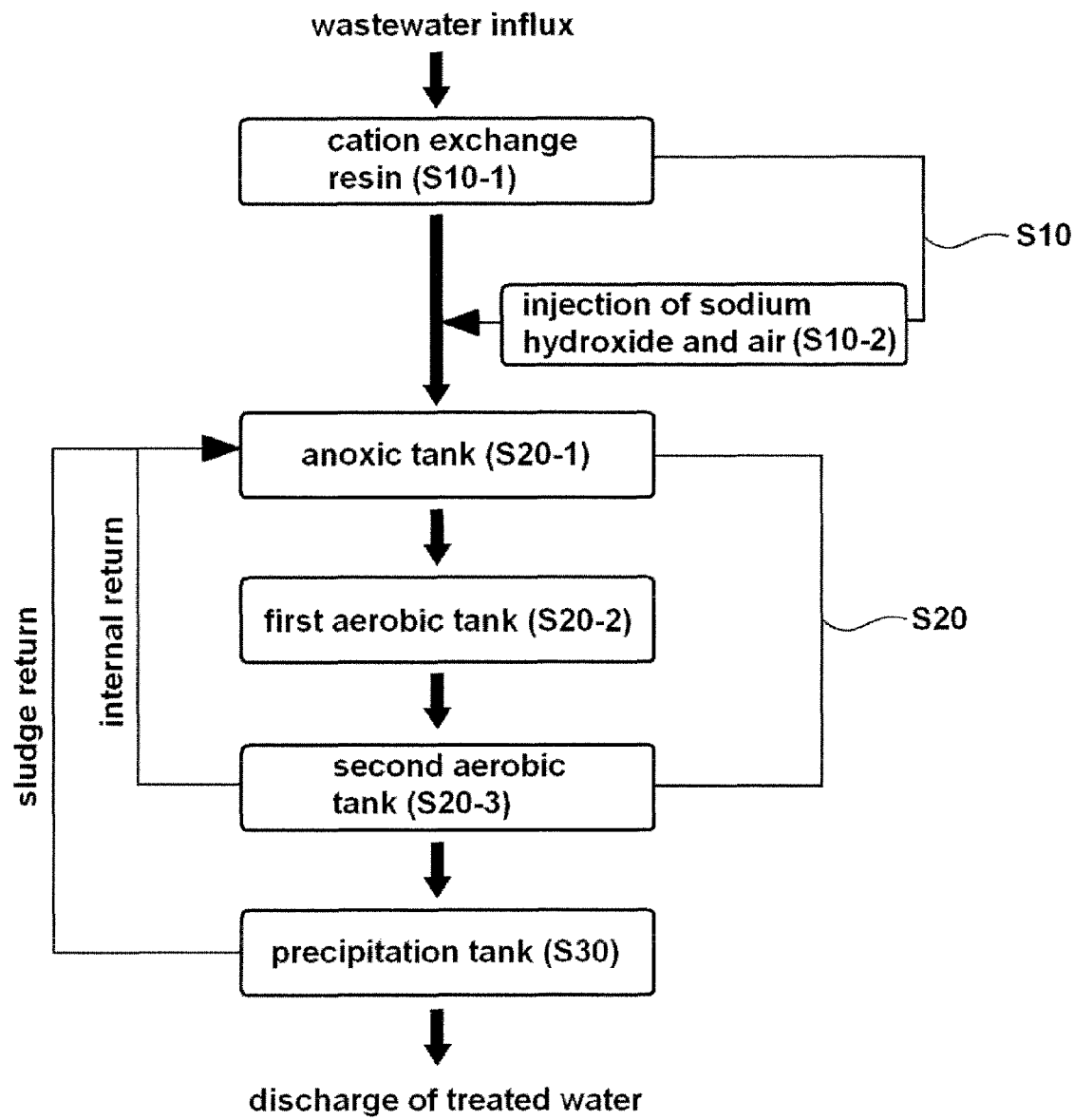
FIG. 1 is a flow chart illustrating an advanced treatment method of ethanolamine-containing wastewater based on a combination of physicochemical and biological treatment processes according to the present disclosure.

FIG. 1 is a flow chart illustrating an advanced treatment method of ethanolamine-containing wastewater based on a combination of physicochemical and biological treatment processes according to the present invention.

The wastewater undergoes a physicochemical process (S10), firstly, where the wastewater flows into cation exchange resin to capture ethanolamine (S10-1), and sodium hydroxide and air are injected into the cation exchange resin that captured the ethanolamine, such that the wastewater can be collected (S10-2). The wastewater is subsequently vaporized and condensed to reduce the volume and remove some impurities.

After that, the wastewater treated through the physicochemical process of S10 undergoes a biological process (S20) where the wastewater is denitrated in an anoxic tank (S20-1), the ethanolamine is decomposed from the wastewater treated at S20-1 and then converted into ammonia and carbon compound in a first aerobic tank (S20-2), and ammonia and non-decomposed ethanolamine are oxidized to form nitrous acid and nitrate in a second aerobic tank as a nitration tank (S20-3).

Figure 2:
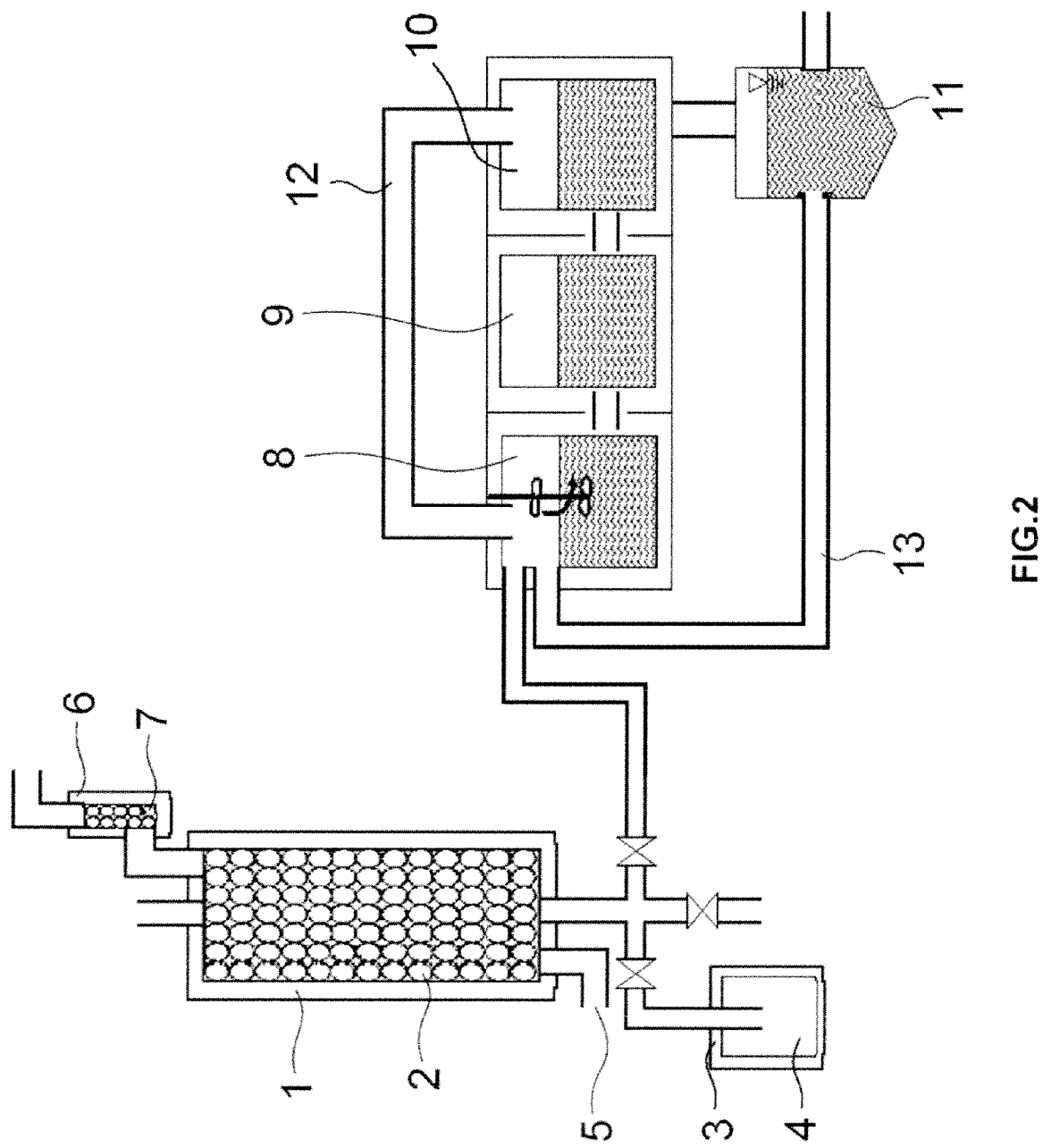
FIG. 2 is a schematic view depicting a system applied to an exemplary embodiment of the present invention.

FIG. 2 is a schematic view depicting a system that treats ethanolamine-containing wastewater based on the method of the present invention. The system is configured to include a physicochemical process unit and a biological process unit.

The physicochemical process unit includes: an ion exchange resin tower 1 filling with cation exchange resin 2 allows the wastewater to pass therethrough; and a sodium hydroxide tank 3 injects sodium hydroxide solution 4 to the ion exchange resin tower 1 while air 5 is injected into the ion exchange resin tower 1, thereby stirring the cation exchange resin tower 2. Here, the ion exchange resin tower 1 is made of a polymeric material or metals, such as stainless steel, so as not to be corroded by a strong base resin.

The biological process unit includes an anoxic tank 8, a first aerobic tank 9, and a second aerobic tank 10, which are connected in series, decompose the ethanolamine from the highly concentrated wastewater of a few to tens of thousand ppm that has undergone the physicochemical process. The biological process unit further includes a sedimentation tank 11 through which the ethanolamine-decomposed wastewater is drained. The sedimentation tank 11 leads to a series of biological reactions and treats the sludge. The floating matter of the second aerobic tank 10 is returned to the anoxic tank 8 through an internal return line 12. The excessive sludge of the sedimentation tank 11 is returned to the anoxic tank 8 through a sludge return line 13.

In addition, as shown in FIG. 2, an adsorption tower 6 is installed to one side of the ion exchange resin tower 1 to prevent ethanolamine from discharging into the air. The adsorption tower 6 fills with an adsorbent agent 7, such as a zeolite adsorbent. The zeolite is formed to have a microporous structure whose spaces can combine with chemical materials physically or chemically. Therefore, the zeolite adsorbent can adsorb gaseous water and ethanolamine while they are passing therethrough together with air.

The physicochemical process is composed of an ion-exchange step and a concentration step.

In the ion-exchange step, ethanolamine presented in the wastewater is captured through the cation exchange resin 2 filled in the ion exchange resin tower 1. If the ion-exchange ability of the cation exchange resin 2 is decreased, a sodium hydroxide solution 4 from the sodium hydroxide tank 3 and air 5 are injected into the ion exchange resin tower 1 and the cation exchange resin 2 is stirred therein. The cation exchange resin 2 is preferably implemented with sulfonic acid cation exchange resin based on divinylbenzene styrene copolymer.

In the concentration step, wastewater is regenerated as the sodium hydroxide solution 4 of the sodium hydroxide tank 3 and air 5 pass through the ion exchange resin in the ion exchange resin tower 1. In particular, initially flown ethanolamine-containing wastewater is relatively highly concentrated to in the range of 1/10,000~1/20,000, and the amount of wastewater is reduced.

Next, the wastewater having undergone the physicochemical process, being reduced its amount, is transferred to the biological process unit that performs a biological process through the anoxic tank 8 and first and second aerobic tanks 9 and 10.

The anoxic tank 8 de-nitrifies a nitrogen intermediate compound of the decomposed ethanolamine, i.e., nitrous acid or nitric acid to convert it into gaseous nitrogen. The anoxic tank 8 receives the floating matter (Mixed Liquid Suspended Solid, MLSS) from the second aerobic tank 10 through the internal return line 12. When excessive sludge is returned to the anoxic tank 8, the de-nitrification speed is increased. In addition, since carbon sources in the influx wastewater and the return floating matter act as a nutrient required for de-nitrification, they encourage de-nitrification.

The first aerobic tank 9, serving as a decomposition oxidatation tank, performs a process where the injected ethanolamine is decomposed and converted into ammonia and carbon compound. The first aerobic tank 9 is filled with a foam filling carrier of a polymer material to maintain highly concentrated ethanolamine. The foam filling carrier is shaped as a sphere and made of polyurethane, which contains porous spaces. The foam filling carrier has biofilms that are formed as microorganisms of high density are inhabited therein, thereby relieving biological inhibition of ethanolamine and ammonia.

The second aerobic tank 10, serving as a nitration tank, oxidizes ammonia and non-decomposed ethanolamine to form nitrous acid and nitrate. The second aerobic tank 10 operates in such a way that the nitrous acid and the nitrate can be accumulated at the maximum concentration. The second aerobic tank 10 is filled with a foam filling carrier that is shaped as a sphere and made of polyurethane within which porous spaces exist to overcome ammonia inhibition. The carrier is implemented with genus *nitrosomonas*.

The sedimentation tank 11 returns the sludge to the anoxic tank 8 via the sludge return line 13.

Therefore, as the advanced treatment method according to the present invention performs a physicochemical process, composed of an ion exchange step and a concentration step, and a biological process composed of decomposing ethanolamine and performing denitrification, the ethanolamine-containing wastewater can be treated to meet the biochemical oxygen demand (COD) value and nitrogen demand value for the environmental discharge standard and then discharged into the environment.

As described above, according to the present invention, as the ion exchange resin is regenerated when ethanolamine is injected in the wastewater discharged from the nuclear power plants and thermal power stations, the wastewater can be cost-effectively treated and then drained, satisfying the environmental discharge standard.

In addition, according to the present invention, without increasing the loads on the conventional wastewater treatment plants, the water/vapor circulation system of the nuclear power plants and thermal power stations can perform environmentally friendly processes. Also, the advanced treatment method of the present invention can be usefully applied to the wastewater treatment technology because it can treat wastewater at the same time as ethanolamine is increased in the water/steam circulation system of the nuclear power plants and the thermal power stations.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

We claim:

1. An advanced treatment method of ethanolamine-containing wastewater comprising:
   a. a physicochemical process comprising:
      i. an ion-exchanging step where ethanolamine in wastewater is captured by a cation exchange resin filled within an ion exchange resin tower; and
      ii. a concentrating step where sodium hydroxide solution is transferred from a sodium hydroxide tank and air is passed through the cation exchange resin to reduce the volume of the ethanolamine-containing wastewater; and
   b. a biological process where the ethanolamine-containing wastewater concentrated through the physicochemical process is passed through and treated by an anoxic tank, a first aerobic tank, and a second aerobic tank.

2. The method as recited in claim 1 wherein the first aerobic tank fills a foam filling carrier forming a biological membrane in such a way as to firmly maintain the highly concentrated ethanolamine load and to relieve biological inhibition of ethanolamine and ammonia.

3. The method as recited in claim 1 where the ethanolamine is decomposed from the waste water and converted into ammonia and carbon and a carbon compound in the first aerobic tank.

4. The method as recited in claim 3 where the ammonia non-decomposed ethanolamine are oxidized to form nitrous acid and nitrate in the second aerobic tank.

5. The method as recited in claim 1 where the second aerobic tank is a nitration tank.

6. The method as recited in claim 1 where air is passed through the cation exchange resin through an ion exchange resin tower.

7. The method as recited in claim 6 where the ion exchange resin tower is comprised of a polymeric material.

8. The method as recited in claim 6 where the ion exchange tower is comprised of stainless steel so as not to be corroded by the cation exchange resin.

9. The method as recited in claim 1 where the flow of the ethanolamine-containing wastewater is serially through the anoxic tank, the first aerobic tank, and the second aerobic tank.

10. The method as recited in claim 9 where following the second aerobic tank, the ethanolamine-containing wastewater is passed to a sedimentation tank where the ethanolamine-containing wastewater is drained.

11. The method as recited in claim 10 where excessive sludge in the sedimentation tank is returned to the anoxic tank through a sludge return line.

12. The method as recited in claim 11 where when the excess of sludge is returned to the anoxic tank, increasing the denitrification rate of the ethanolamine-containing wastewater.

13. The method as recited in claim 9 where floating matter in the second aerobic tank is returned to the anoxic tank through an internal return line.

* * * * *